US011810387B2

(12) United States Patent
Maeda et al.

(10) Patent No.: US 11,810,387 B2
(45) Date of Patent: Nov. 7, 2023

(54) LOCATION SYSTEM AND METHOD

(71) Applicant: Hitachi, Ltd., Tokyo (JP)

(72) Inventors: Daisuke Maeda, Mountain View, CA (US); Sudhanshu Gaur, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 372 days.

(21) Appl. No.: 17/313,780

(22) Filed: May 6, 2021

(65) Prior Publication Data

US 2022/0358311 A1  Nov. 10, 2022

(51) Int. Cl.
*G06V 40/10* (2022.01)
*H04N 7/18* (2006.01)
*G06V 20/40* (2022.01)
*G06V 10/80* (2022.01)
*G06V 20/52* (2022.01)

(52) U.S. Cl.
CPC ............ *G06V 40/103* (2022.01); *G06V 20/40* (2022.01); *H04N 7/181* (2013.01); *G06V 10/811* (2022.01); *G06V 20/52* (2022.01)

(58) Field of Classification Search
CPC ...... G06V 40/103; G06V 10/80; G06V 20/40; G06V 20/52; G06V 20/70; G06V 2201/00; H04N 7/181; H04N 7/183
See application file for complete search history.

(56) References Cited

U.S. PATENT DOCUMENTS

| | | | |
|---|---|---|---|
| 10,515,337 B1 | 12/2019 | Niranjayan et al. | |
| 2012/0046044 A1* | 2/2012 | Jamtgaard | G01S 5/02585 455/456.1 |
| 2016/0379074 A1* | 12/2016 | Nielsen | G01S 19/485 348/143 |
| 2020/0143561 A1* | 5/2020 | Hallett | G06T 7/13 |

FOREIGN PATENT DOCUMENTS

WO    WO 2019/191146    * 10/2019    ............. G06V 20/52

* cited by examiner

*Primary Examiner* — Vincent Rudolph
*Assistant Examiner* — Timothy Choi
(74) *Attorney, Agent, or Firm* — Procopio, Cory, Hargreaves & Savitch LLP

(57) ABSTRACT

Example implementations involve a location system, which can involve associating each location of one or more unidentified targets detected from sensor data of the one or more sensors with identifiers corresponding to the transmitter of each of the one or more pairs of electronic devices, by calculating first distance relationships indicative of relationships of distances between the each location of the one or more unidentified targets detected from the sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the (Continued)

first distance relationships and the second distance relationships.

16 Claims, 14 Drawing Sheets

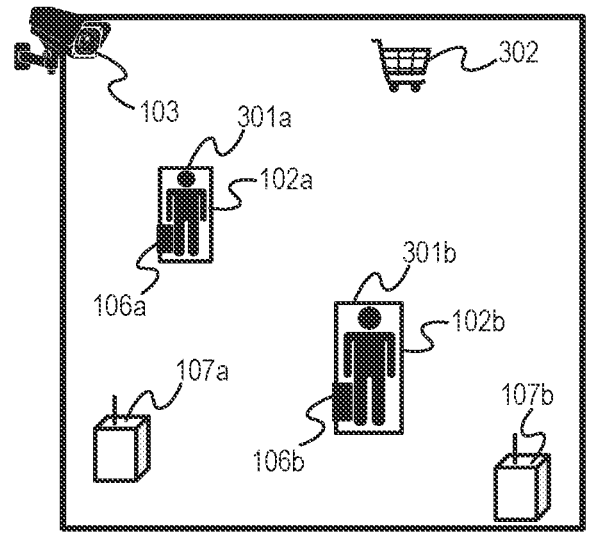
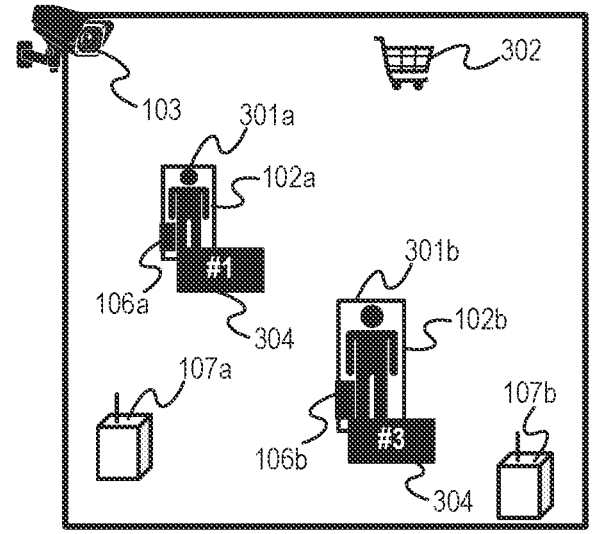
FIG. 3A  FIG. 3B
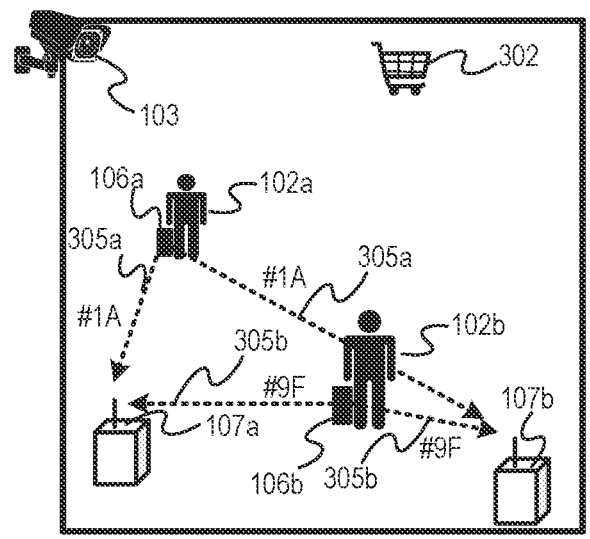
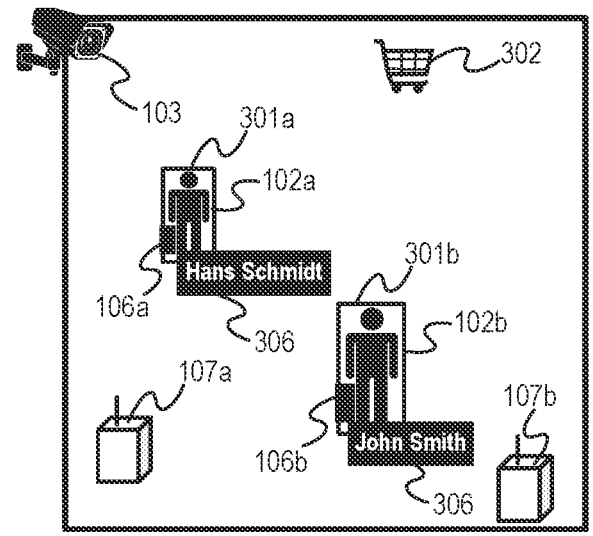
FIG. 3C  FIG. 3D

|  | RSSI | Ranking |
|---|---|---|
| Tag #1A | -55 dB | 1 |
| Tag #1B | -60 dB | 2 |
| Tag #1C | -65 dB | 3 |

FIG. 5

|  | Distance to receiver | Ranking |
|---|---|---|
| Bounding Box #1 | 150 pixels | 1 |
| Bounding Box #2 | 250 pixels | 3 |
| Bounding Box #3 | 200 pixels | 2 |

FIG. 6

|  | Bounding box #1 | Bounding box #2 | Bounding box #3 |
|---|---|---|---|
| Tag #1A | Cost =\|1-1\|=0 | Cost =\|3-1\|=2 | Cost =\|2-1\|=1 |
| Tag #1B | Cost =\|1-2\|=1 | Cost =\|3-2\|=1 | Cost =\|2-2\|=0 |
| Tag #1C | Cost =\|1-3\|=2 | Cost =\|3-3\|=0 | Cost =\|2-3\|=1 |

FIG. 7

LOCATION SYSTEM AND METHOD

BACKGROUND

Field

The present disclosure is directed to signal processing systems, and more specifically, to personal identification and location systems.

Related Art

Improving the productivity of factory workers has been one of the key issues in the manufacturing industry. In particular, the demands for measuring the productivity of each worker is getting attention because of the recent advancements of personal identification technologies.

Measuring personal productivity potentially reveals reasons for underperforming productivity of a worker. By understanding the personal productivity, high-level managers may optimize the personal or global productivity by giving appropriate training or planning efficient worker assignment.

However, related art implementations currently involve facial recognition technology as the method of a personal identification. Such related art implementations cause privacy concerns because it is difficult for anyone in the field of view of a camera to escape from being a subject of the facial recognition technology, due to the measurement capabilities of an optical camera.

In related art implementations, a method that associates the data of motion sensors on a mobile device with an identifier, and the activities of people are calculated from optical images taken by a camera to identify each person.

SUMMARY

Aspects of the present disclosure can involve a computer program, storing instructions for executing a process on a location system involving one or more sensors, a computer device, and one or more pairs of electronic devices involving a transmitter configured to transmit wireless media and a receiver configured to receive wireless media, the instructions involving associating each location of one or more unidentified targets detected from sensor data of the one or more sensors with identifiers corresponding to the transmitter of each of the one or more pairs of electronic devices, the associating including calculating first distance relationships indicative of relationships of distances between the each location of the one or more unidentified targets detected from sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships. The computer program can be stored on a non-transitory computer readable medium and executed by one or more processors.

Aspects of the present disclosure can involve a method for a location system involving one or more sensors, a computer device, and one or more pairs of electronic devices involving a transmitter configured to transmit wireless media and a receiver configured to receive wireless media, the method involving associating each location of one or more unidentified targets detected from sensor data of the one or more sensors with identifiers corresponding to the transmitter of each of the one or more pairs of electronic devices, the associating including calculating first distance relationships indicative of relationships of distances between the each location of the one or more unidentified targets detected from sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships.

Aspects of the present disclosure can involve a location system involving one or more sensors, a computer device, and one or more pairs of electronic devices involving a transmitter configured to transmit wireless media and a receiver configured to receive wireless media, the computer device configured to associate each location of one or more unidentified targets detected from sensor data of the one or more sensors with identifiers corresponding to the transmitter of each of the one or more pairs of electronic devices, the associating including calculating first distance relationships indicative of relationships of distances between the each location of the one or more unidentified targets detected from sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships.

Aspects of the present disclosure can involve a computer device in a location system involving one or more sensors, and one or more pairs of electronic devices involving a transmitter configured to transmit wireless media and a receiver configured to receive wireless media, the computer device involving a processor configured to associate each location of one or more unidentified targets detected from sensor data of the one or more sensors with identifiers corresponding to the transmitter of each of the one or more pairs of electronic devices, the associating including calculating first distance relationships indicative of relationships of distances between the each location of the one or more unidentified targets detected from sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships.

BRIEF DESCRIPTION OF DRAWINGS

FIGS. 3(A) to 3(D) illustrate the schematics of each signal processing block output, in accordance with an example implementation.

FIG. 5 illustrates an example result of the distance estimation block and the distance ranking, in accordance with an example implementation.

FIG. 6 illustrate an example result of the person labeling block and its distance ranking, in accordance with an example implementation.

FIG. 7 illustrates an example result of the cost calculation and the Hungarian Method, in accordance with an example implementation.

DETAILED DESCRIPTION

Figure 1:
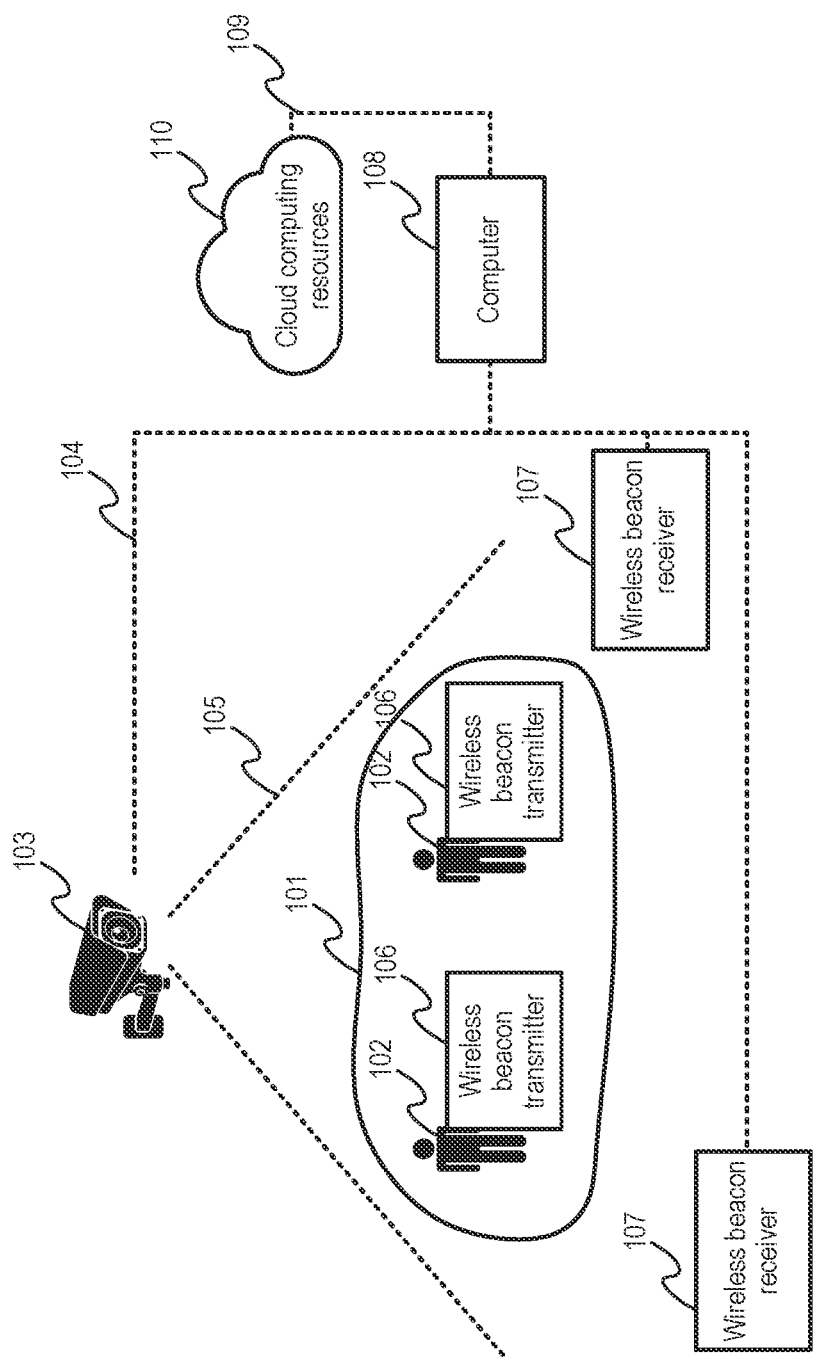
FIG. 1 illustrates one example of the block diagram of the system architecture, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to signal processing technologies and a system architecture as described herewith.

A system for a personal localization is provided in the first example implementation as follows.

FIG. 1 illustrates one example of the block diagram of the system architecture, in accordance with an example implementation. Specifically, FIG. 1 illustrates an example block diagram of the personal localization system described herein. In this example, the system is monitoring a target area 101 so it can track a person 102. The system can involve a camera 103 with a field of view 105, a network 104, a wireless beacon transmitter 106 that is on or with the person 102, a wireless beacon receiver 107, a local computer 108, an internet connection 109, and cloud computing resources 110.

In the system illustrated in FIG. 1, all of the data processing capabilities are location independent. Therefore, the local computer 102 may take over all the capabilities that the cloud computing resources 110 can provide. Alternatively, the cloud computing resources 110 may take over all the capabilities that the local computer 102 can provide. The computing load allocation depends on the available computing resources and a cost for using resources on the cloud computing resources 110, and can be adjusted to the desired implementation.

Figure 2:
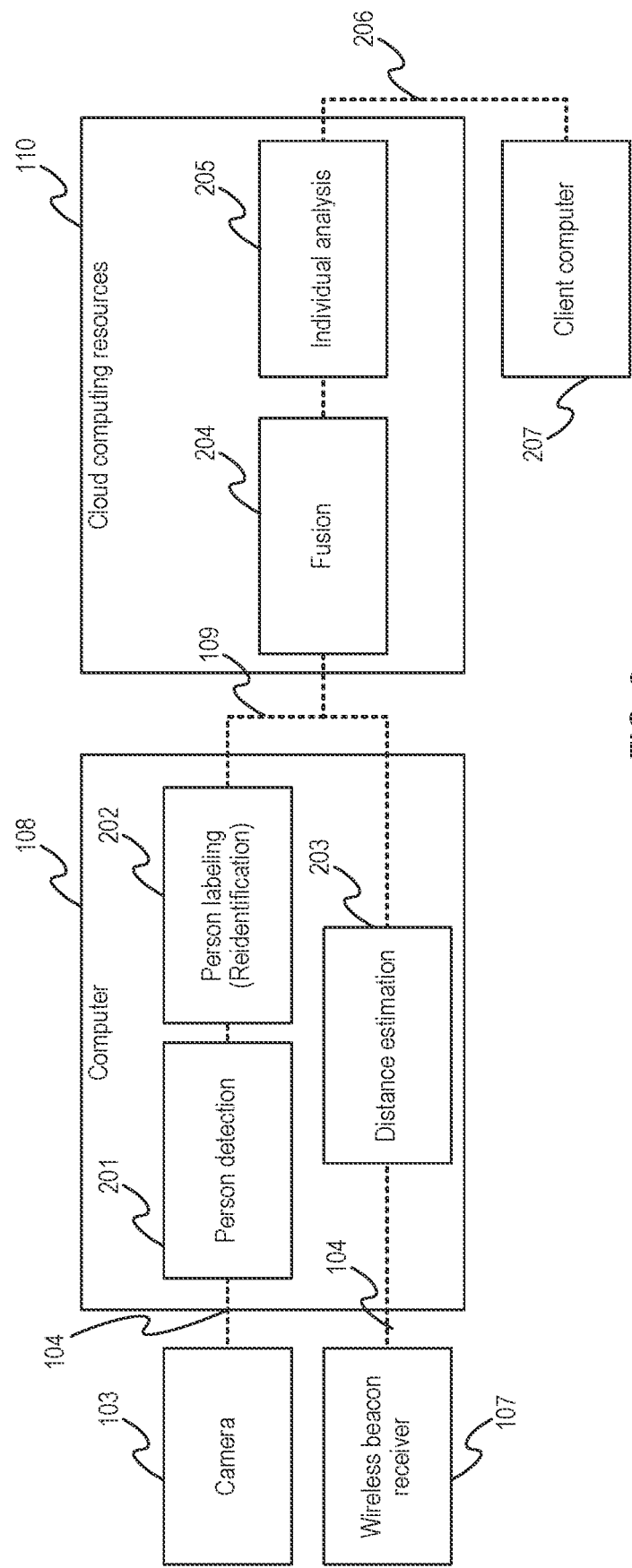
FIG. 2 illustrates an example block diagram of the signal processing pipeline that is performed on the local computer and the cloud computing resources, in accordance with an example implementation.

FIG. 2 illustrates an example block diagram of the signal processing pipeline that is performed on the local computer 108 and the cloud computing resources 110, in accordance with an example implementation. The interactions of the elements of the example block diagram of FIG. 2 are described with respect to FIGS. 3(A) to 3(D), each of which illustrate the schematics of each of the signal processing block's output.

Images continuously or intermittently captured by the camera 103 will be transferred to a person detection block 201 via the network 104. In this block, persons in the images, namely in the field of view 105 of the camera, are detected and located in the field of view 105. Detecting persons can be performed by a machine learning method that detects people or through other methods known in the art according to the desired implementation. In an example implementation, the machine learning method can be trained by images taken in the target area 101 to improve the detection accuracy of the machine learning method.

Here the camera 103 is not necessarily limited to an optical camera. For example, other sensors capable of providing appropriate sensor data such as a LiDAR (Light Detection and Ranging) device or any other detection device (e.g., involving a device and information source) that can identify a relative location of one or more unidentified targets can be used in replacement of the camera 103 to facilitate the desired implementation. Thus, a location system can be formed from the camera 103 or other detection device with the appropriate sensors to provide sensor data, the wireless beacon receiver 104, and the local computer 108 to facilitate person detection 201, person labeling 202, and distance estimation 203 and conduct localization/detection functionality on the one or more persons detected by the camera 103 or other detection device with the appropriate sensors to provide sensor data. As will be described herein, the example implementations incorporate a combination of sensed data to accurately determine the spatial location of one or more unidentified targets and distance between the one or more unidentified targets and the reference point. Although example implementations described herein involve the use of cameras and video, other types of sensed information that accurately facilitate the determination of the spatial location of the one or more unidentified targets and the distance between the one or more unidentified targets and reference point can be used in conjunction with the example implementations described herein.

In FIG. 3(A), two persons 102a and 102b that are detected and located by the person detection block 201 are shown as bounding boxes 301. Then, the images with the location information of the bounding boxes will be processed in a person labeling block 202. This process is also known as "re-identification." In this block, the appearance of the detected people is analyzed and identified. More specifically, this process will provide a unique number (called a "label") for each person. Therefore, after the processing in the person labeling block 202, each bounding box 301 will have a unique label 304, as shown in FIG. 3(B). As an example, the person 102a in the left is assigned as #1 and the person 102b in the right is assigned as #3. Ideally, as long as the appearance of the person remains the same, these labels should also be the same. Labeling by the appearance of the person can be performed by another machine learning method that identify people by their appearance, or otherwise in accordance with the desired implementation. For example, the machine learning method can be trained by images taken in the target area 101 to improve the detection accuracy of the machine learning method.

In addition, in the system disclosed here, people 102a and 102b possess a wireless beacon transmitter 106a and 106b respectively. The wireless beacon transmitters 106a and 106b transmit beacons with their unique hardware address such as a MAC (Media Access Control) address. Then, the beacons transmitted by the wireless beacon transmitters 106a and 106b may be received by one or more wireless beacon receivers 107a and 107b. Thanks to the unique hardware address of beacons, the wireless beacon receivers 107a and 107b are able to identify the origin (transmitter) of a received wireless beacon. In addition, by calculating the strength of the received beacon (RSSI [Received Signal Strength Index] for example), or the time of flight of the beacons, the wireless beacon receivers 107a and 107b can estimate the distance between itself (the wireless beacon receiver 107a or 107b) and the wireless beacon transmitter 106a or 106b that transmitted the beacon.

Here the wireless beacon transmitter 106 and the wireless beacon receiver 107 are not necessarily limited to a typical beacon transceiver pair. For example, a cellular phone having a wireless transceiver or any other known method involving a device and information source that can identify a unique identifier (ID) (e.g., hardware identifier) and its distance to a reference point can be used in replacement of the wireless beacon transmitter 106 and the wireless beacon receiver 107 to facilitate the desired implementation. The wireless medium is also not limited to wireless radio. For example, audible/ultrasonic sound or light can be the medium for this transmitter 106 and receiver 107 as long as they can transmit a unique identifier.

In FIG. 3(C), the person 102a in the left has a wireless beacon transmitter 106a transmitting a beacon 305a. The beacon 305a has hardware address #1A which is physically closer to the wireless beacon receiver 107a in the left than the person 102b in the right with the wireless beacon transmitter 106b transmitting beacons 305b with the hardware address #9F. As a result, the received signal strength of the beacon with hardware address #1A will be stronger than beacons with the hardware address #9F at the wireless beacon receiver 107a in the left. Therefore, the wireless beacon receiver 107b in the left can estimate that the wireless beacon transmitter 106a transmitting beacons 305a with the hardware address #1A is closer than the wireless beacon transmitter 106b transmitting beacons 305b with a hardware address #9F.

Conversely, the person 102b in the right has the wireless beacon transmitter 106b transmitting beacons 305a with the hardware address #9F is physically closer to the wireless beacon receiver 107b in the right than the person 102a in the left with the wireless beacon transmitter 106a transmitting beacons 305a with a hardware address #1A. As a result, the received signal strength of beacons with the hardware address #9F will be stronger than beacons with hardware address #1A at the wireless beacon receiver 107b in the right. Therefore, the wireless beacon receiver 107b in the right can estimate that the wireless beacon transmitter 106b transmitting beacons 305b with a hardware address #9F is closer than the wireless beacon transmitter 106a transmitting beacons 305a with a hardware address #1A.

This process is done in a distance estimation block 203 in FIG. 2. In example implementations, one of the novel aspects is the use of two different types of information for distance estimation. One type of information is based on the sensing of the spatial location of the target (e.g. video), and the other type of information is based on the sensing of the accurate distance of the target from a reference point (e.g. RFID tag).

The two sets of the processed data will be processed at a fusion block 204 to associate each label assigned at person labeling block 202 with each hardware address of beacons received at the wireless beacon receivers 107a and 107b. In this example, this process is done on the cloud computing resources 110. Here, the cloud computing resources 110 has a table that associates each person with their corresponding hardware address. As a result, the cloud computing resources 110 can ultimately associate each boundary box 301 with each person's name 306 as shown in FIG. 3(D).

Figure 4B:
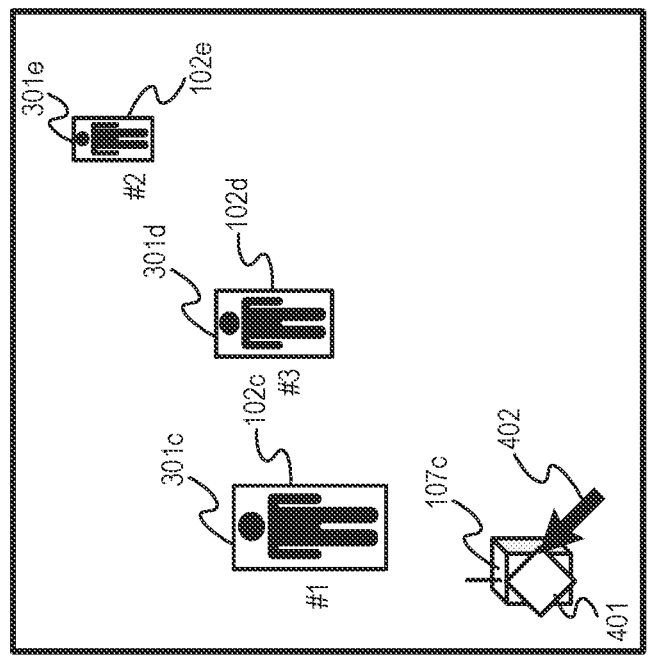
FIGS. 4(A) and 4(B) illustrate an example condition, in accordance with an example implementation.
Figure 4A:
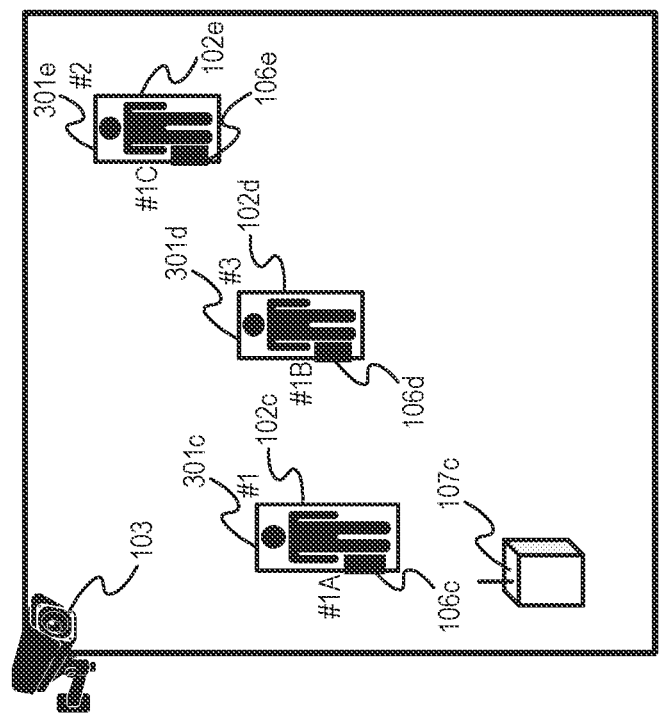

FIGS. 4(A) and 4(B) illustrate an example condition, in accordance with an example implementation. The signal processing that associates each label assigned at person labeling block 202 with each hardware address of beacons received at the wireless beacon receivers 107a and 107b will be explained using FIG. 4(A) and FIG. 4(B). As an example, in this explanation, there are three persons 102c, 102d, and 102e and wireless beacon transmitters 106c (hardware address: #1A), 106d (hardware address: #1B), and 106e (hardware address: #1C), respectively. There is also one wireless beacon receiver 107c.

Figure 8:
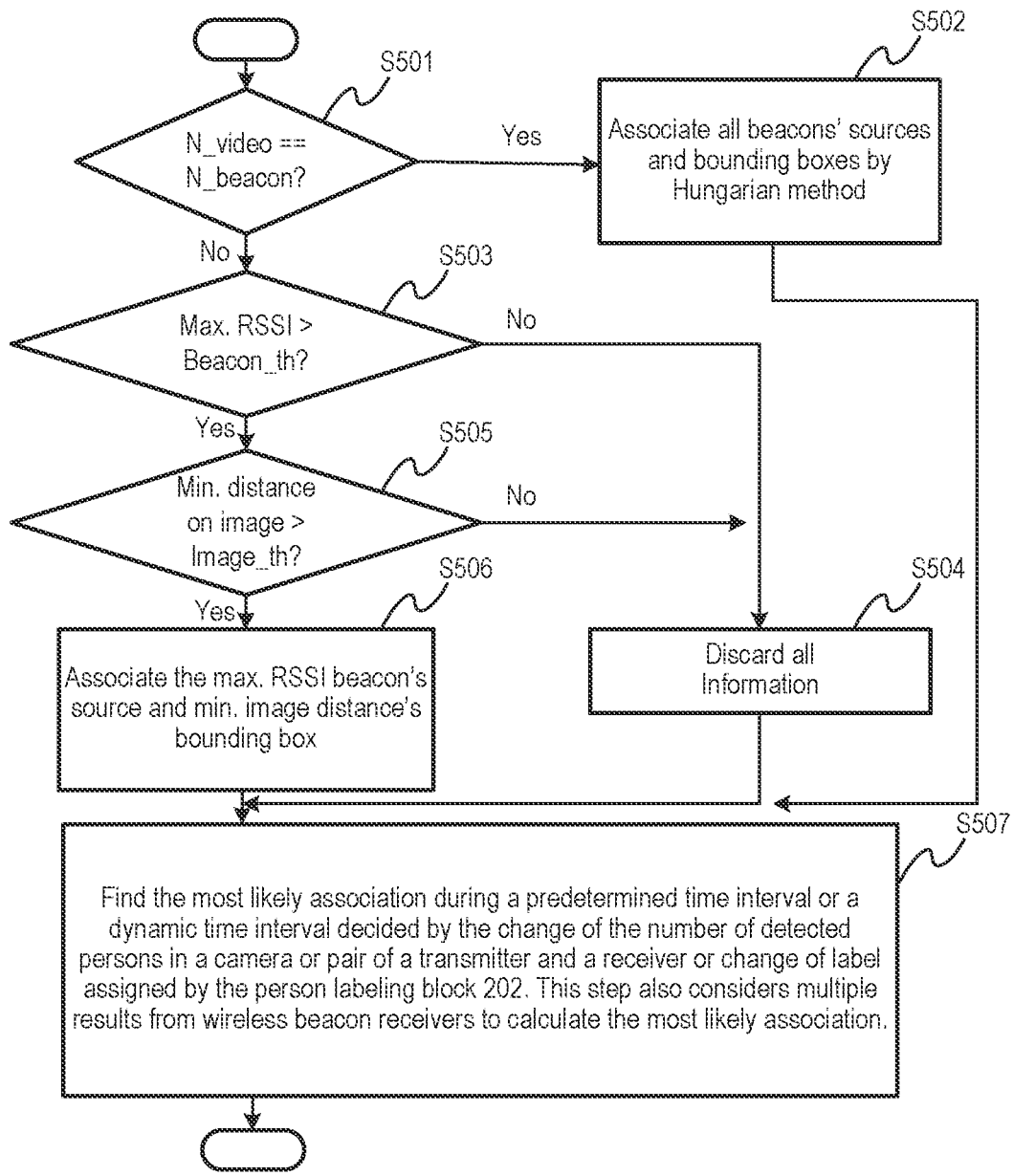
FIGS. 8 and 9 illustrate an example flow chart of the fusion block 204, in accordance with an example implementation.
Figure 9:
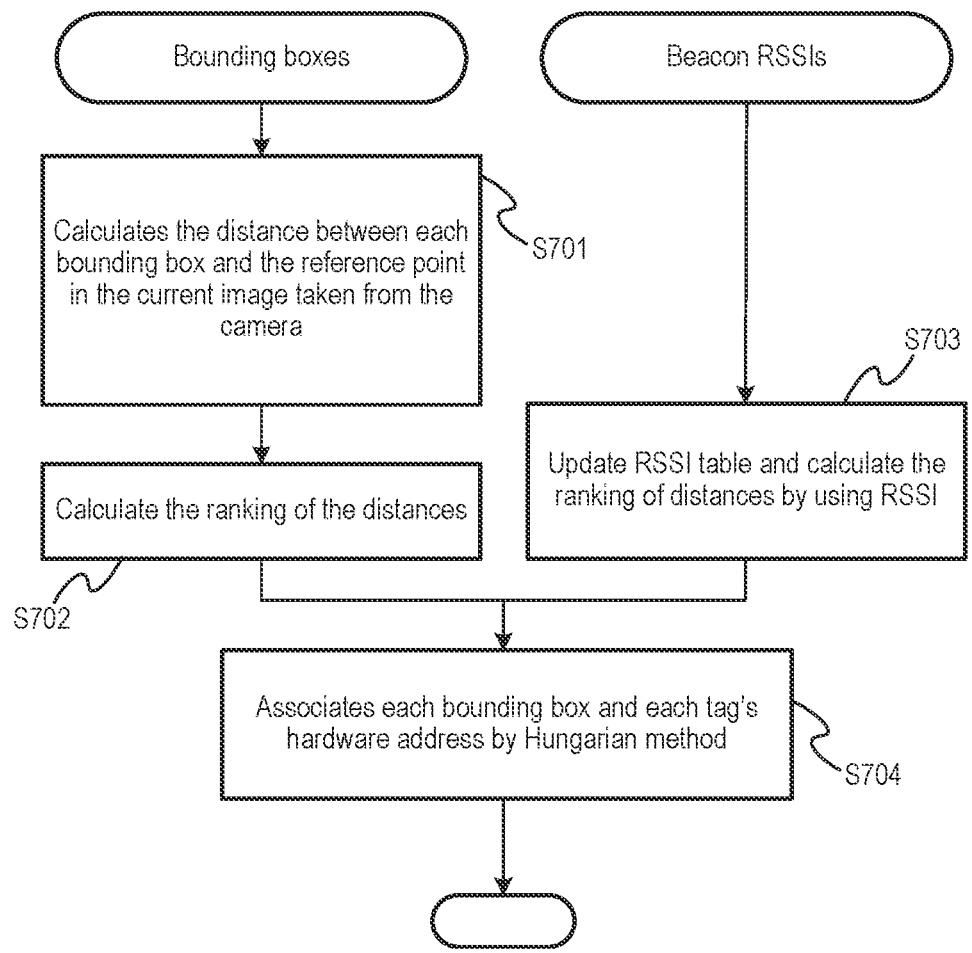

FIGS. 8 and 9 illustrate an example flow chart of the fusion block 204, in accordance with an example implementation. Firstly, the fusion block 204 checks if the number of boundary boxes (N_video) is the same as the number of received beacons' hardware addresses (N_beacon) in S501. If this condition is True, the fusion block 204 goes to S502. FIG. 9 illustrates a detailed flow of the procedure at S502.

The fusion block 204 calculates the distance between each bounding box and the wireless beacon receiver 107c, as a reference point 401, respectively in the current image taken from the camera 103 (S701), as shown in FIG. 6. FIG. 6 illustrate an example result of the person labeling block and its distance ranking, in accordance with an example implementation. In this example, it is assumed that the location of the wireless beacon receiver 107c in the image is provided from a user operation. For example, a user locates where a wireless beacon receiver 107c is in the image taken by a camera 103 (FIG. 4(B)), by using a pointing method 402. Depending on the desired implementation, it is also possible to utilize a visual analytics method (object detection) to identify the location of the wireless beacon receiver 107c as a reference point 401. Such an implementation can eliminate manual operation as desired. Then, the fusion block 204 can calculate the distances in an image.

In such images, actual distance cannot be calculated unless there is a relationship provided between the actual distance and the pixel in the image. However, the actual distance is not necessarily required as this fusion block 204 needs only the relative distances, for example, the ranking of each distance length indicated by a distance between each location of one or more unidentified targets detected from sensor data of the one or more sensors and a reference point.

Through such example implementations, the calculation of the relationship between the actual distance and the pixel distance can thereby be omitted if desired. Accordingly, the flow at S702 can calculate the ranking of the distances from the distances expressed as length in pixels.

The perspective effect that causes distortions of camera images may be a problem when the fusion block 204 calculates relative distances in pixels. For example, the condition of the actual monitoring area in FIG. 4(A) and an image through the camera where farther objects look smaller as shown in FIG. 4(B), are different. The point is the fact that the fusion block 204 is able to get only images with distortion by the perspective effect, which is the latter.

Figure 11B:
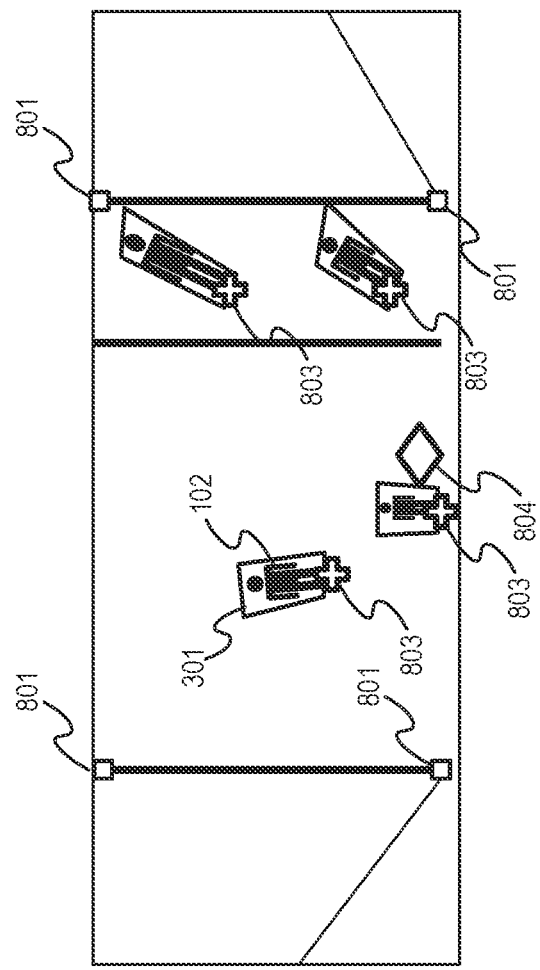
FIGS. 11(A) and 11(B) illustrate examples of perspective transformation, in accordance with an example implementation.
Figure 11A:
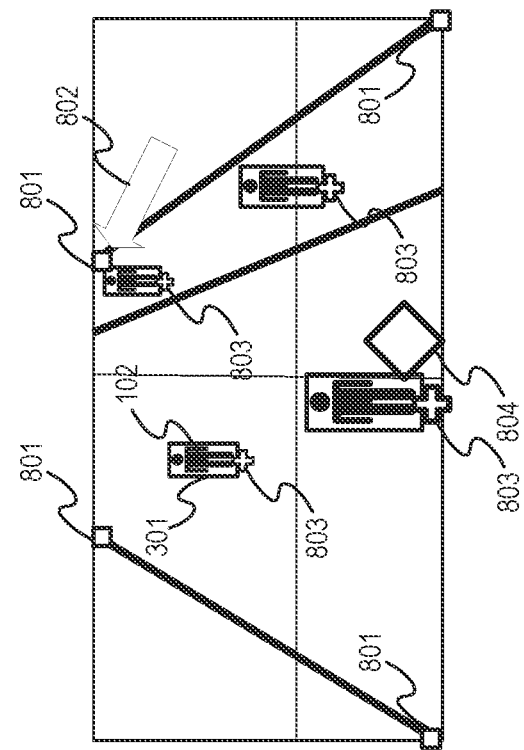

To overcome this perspective effect so the system can calculate accurate relative distances, the fusion block 204 can provide a perspective conversion, before calculating the distance between each bounding box and the wireless beacon receiver 107c respectively in the current image taken from the camera 103 (S701), to achieve a top-view (or a birds-eye view) of camera images. FIGS. 11(A) and 11(B) illustrate examples of perspective transformation, in accordance with an example implementation. For example, a user manually locates some reference points 801 for a perspective transformation and a wireless beacon receiver by using a pointing method 802 through a graphical user interface (FIG. 11(A)), where wireless beacon receiver is shown as a diamond sign 804. After a transformation, (FIG. 11(B)) though the images of the people are deformed, the relative distance between the reference points 803, shown as a plus sign, and the wireless beacon receiver 804 can be calculated more accurately as distortion caused by the perspective effect can thereby be eliminated. This process can be automated by using structures or paints in images that are known to be straight, or otherwise in accordance with the desired implementation.

In S502, the fusion block 204 also updates a table in which the Received Signal Strength Indicator (RSSI) of each tag is listed, as shown in FIG. 5. FIG. 5 illustrates an example result of the distance estimation block and the distance ranking, in accordance with an example implementation. Then, the RSSI ranking by using relative distances is calculated (S703). In the examples described herein, distance relationships indicative of the relationships of distances between the locations of the targets and the reference points can be represented by these calculated relative distances. In additional example implementations, such distance relationships can also involve actual physical distances as based on the reduction level of the received signal strength index (e.g., having a preset relationship between reduction level of RSSI and actual distance in accordance with the desired implementation) as will be described herein.

Lastly, the fusion block 204 associates each bounding box with the hardware address of each tag. For example, the Hungarian Method can be used to calculate the minimum total cost of the association (S704). Here the definition of the cost, defined by relative distances, depends on the target or application. One possible definition of the cost can be the absolute difference between two rankings. FIG. 7 illustrates an example result of the cost calculation and the Hungarian Method, in accordance with an example implementation. The combination with the minimum cost is chosen (underlined) in the example of FIG. 7.

In reality, the number of boundary boxes (N_video) and the number of received beacons hardware addresses (N_beacon) in a designated time period are not necessarily the same. For example, the camera 103 cannot capture a person all the time due to obstacles in the target area 101 or because of errors from the person detection block 201. In addition, the wireless beacons receiver 107 may fail to receive beacons due to wireless media noise factors such as the attenuation of the wireless signal due to an obstacle or multipath fading.

In such situations, as an optional process, the fusion block 204 may try to associate only one set of tag/bounding box that are in proximity to the wireless beacon receiver 107. This policy is chosen because errors in association methods/policies including the Hungarian method degrade the accuracy of association under such the conditions, and closer distance between a wireless beacon transmitter 106 and a wireless beacon receiver 107 is the most reliable fact in terms of accuracy under such the conditions. More specifically, by limiting the range from a receiver 107, it can be assumed that only one candidate exists. In that condition, therefore, the association is limited to bounding boxes in proximity to the wireless beacon receiver 107. The details of the steps for the condition is explained as follows.

In S503, the fusion block 204 checks if the maximum RSSI is larger than the predetermined threshold. This limits the physical distance between the wireless beacon transmitter 106 and the wireless beacon receiver 107.

In S505, the fusion block 204 checks if the distance between the bounding box which is the closest one to the wireless beacon receiver 107 and the wireless beacons receiver 107 is shorter than the predetermined threshold. This limits the physical distance between a person 102 and a wireless beacon receiver 107.

Then, if one of the conditions of S503 and S505 are not satisfied, the fusion block 204 disposes all the information from the person labeling block 202 and the distance estimation block 203 at this time frame (S504).

Otherwise, in S506, the fusion block 204 associates only the hardware address of the wireless beacon transmitter 106 that has the maximum RSSI to the wireless beacon receiver 107 with the label of the bounding box which is the closest one to the wireless beacon receiver 107.

Repetition of the steps shown in FIG. 8, preferably periodically and continuously, will create a data set in which multiple association pairs between the hardware address of wireless beacon transmitters and the labels of bounding boxes. This data set will be taken from an individual analysis block 205.

If an application is not so sensitive to the latency, the last step, S507, may keep a long-term dataset and pick the best association pairs by a majority principle from the long-term dataset. For example, if there are 40 pairs of record between hardware address #1A and label #100 and 45 pairs of record between hardware address #9F and label #100 during a predetermined time interval, the individual analysis block 205 would consider hardware #1A corresponds to #100 because it is the most likely.

Further, the time interval to calculate the most likely association can be dynamically changed to fit the desired implementation. For example, a time interval can be decided by identifying the change of the number of detected persons in a camera or pairs of transmitters and receivers. In another example, identifying the change of a label assigned by the person labeling block 202 can also be another trigger to decide the time interval.

If an application at a client computer 207 requires a real-time result, S507 will pass the latest association results to the client computer 207 via an internet connection 206.

If there are two or more cameras or wireless beacon receivers, the client computer 207 can fuse each cost calculated by respective cameras or wireless beacon receivers. For example, the sum of each cost calculated by respective cameras or wireless beacon receivers would provide a more holistic cost information. Another example is removing outliers by comparing each cost calculated by respective cameras or wireless beacon receivers to eliminate outliers that degrade the accuracy of fused cost. Then the client computer 207 chooses a pair of association which is the minimum cost (the highest likelihood) among the fused cost information.

Figure 10A:
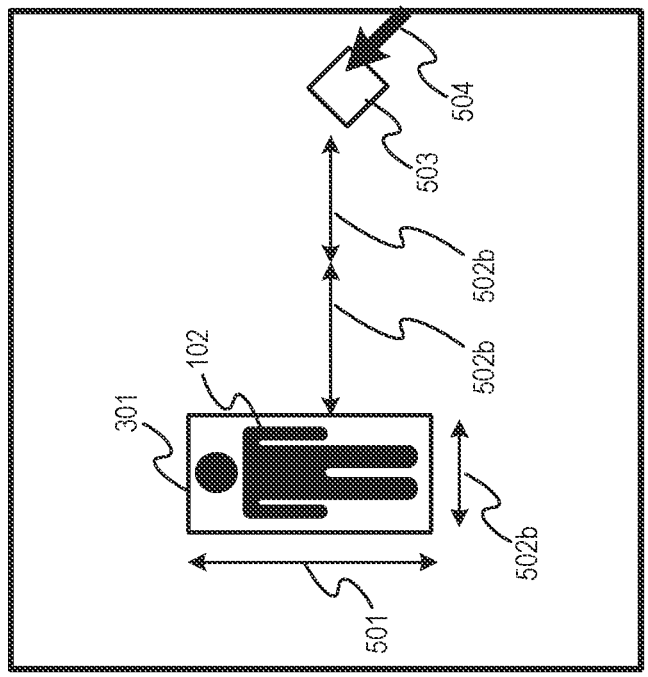
FIGS. 10(A) and 10(B) illustrate an example schematic of distance estimation using a bounding box, in accordance with an example implementation.
Figure 10B:
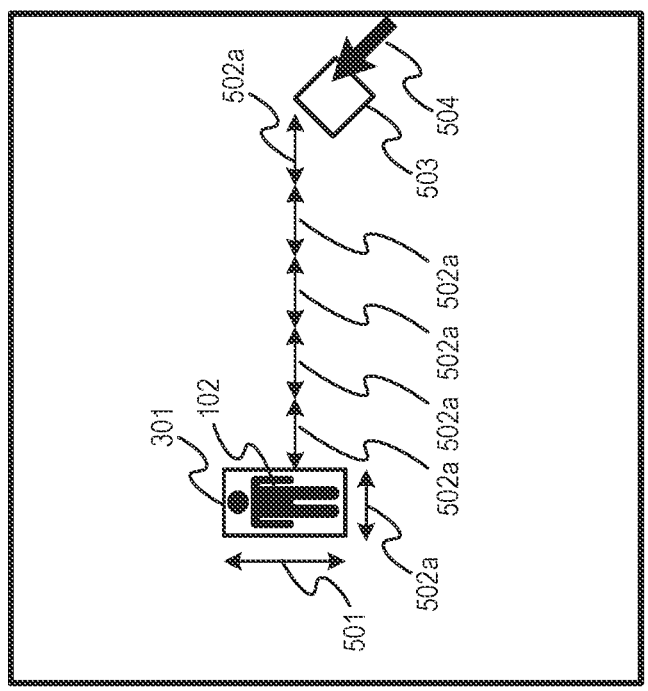

In a second example implementation, a threshold used in S505 of the fusion block 204 to see if the closest bounding box is closer than the threshold to a wireless beacon receiver 107, is automatically decided as follows. FIGS. 10(A) and 10(B) illustrate an example schematic of distance estimation using a bounding box, in accordance with an example implementation.

Firstly, a user locates where a wireless beacon receiver (a reference point) 503 is in the image taken by a camera 103, by using a pointing method 504 (FIG. 10(A)) or a visual analytics method (object detection). Then, a bounding box 301, as a result of the result of the person detection block 201 and the person labeling block 202, will be utilized to calculate the threshold.

Here a bounding box 301 height 501 and width 502a can be considered as an adult height and width (e.g., average height/width). Therefore, for example, the fusion block 204 can calculate the relationship between the actual length and the number of pixels on an image. In FIG. 10(A), the width of the bounding box 502a is used to estimate the distance between a person 102 and a wireless beacon receiver 503, which is five times of the width of the person 502a. Since the size of an object in a camera image is varied by the distance between a camera 103 and the target, if a person 102 is closer to the camera 103 than the condition of FIG. 10(A), it might have the appearance of FIG. 10(B). In FIG. 10(B), the width of the bounding box of a person 502b is used to estimate the distance between the person 103 and a wireless beacon receiver 503. In this example, the distance corresponds to two times of the width of the bounding box 502b. This method gives a rough estimation of an actual distance in a camera image. Without that estimation, the threshold used in S505 has to be designated manually. Therefore, this estimation method may reduce the deployment cost of the system.

Through such example implementations, personal localization can be realized without facial recognition technology. As bringing a wireless beacon transmitter is an opt-in basis, one may conduct personal productivity analysis without privacy concerns.

Figure 12:
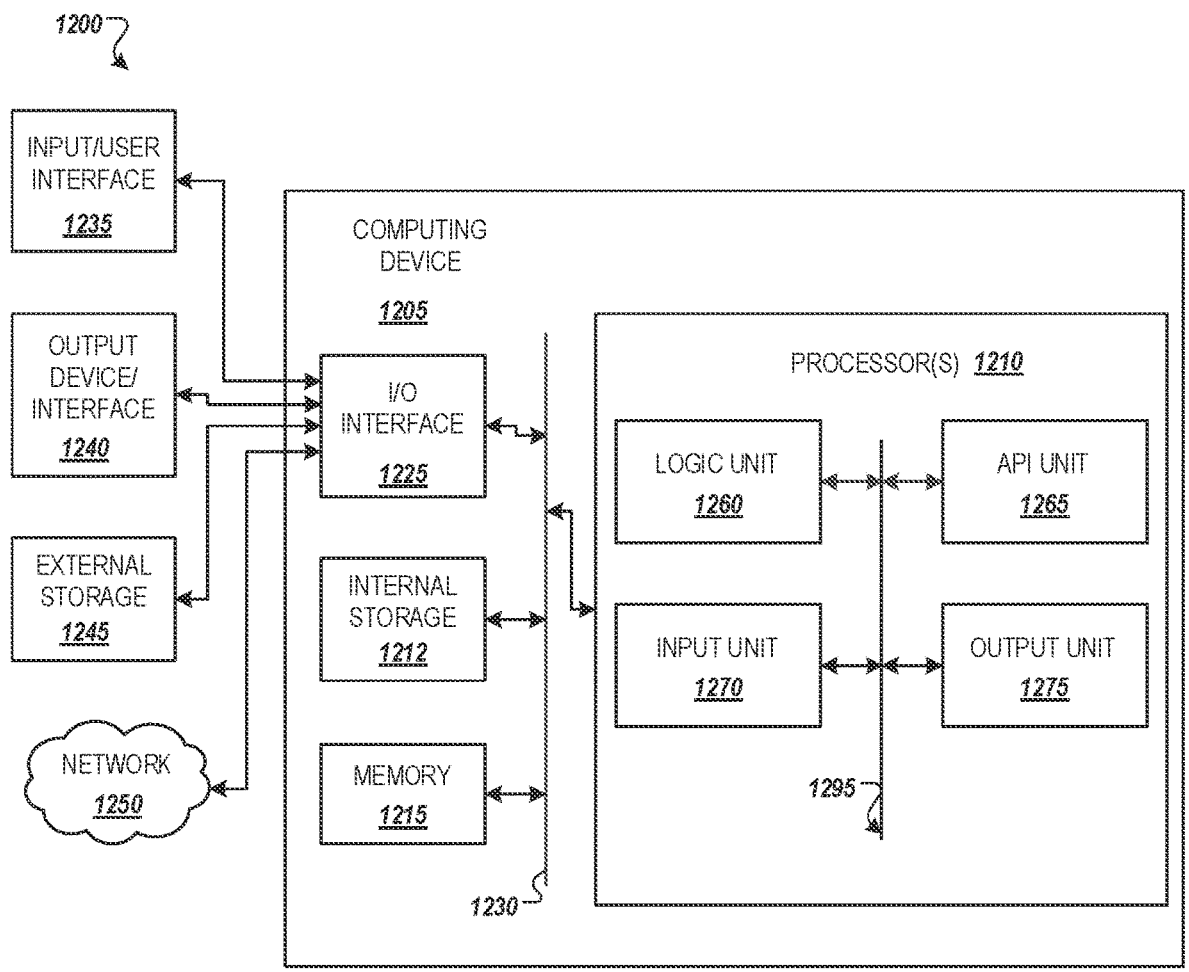
FIG. 12 illustrates an example computing environment with an example computer device suitable for use in some example implementations.

FIG. 12 illustrates an example computing environment with an example computer device suitable for use in some example implementations, such as a computer 108 or cloud computing resources 110 as illustrated in FIG. 2. In an example, the computer device can facilitate cloud computing resources 110 to interact with a location system that involves one or more sensors such as a camera/other detection device, one or more pairs of electronic devices such as a wireless transmitter configured to transmit wireless media and a wireless beacon receiver to receive the wireless media, and the computer device 1205.

Computer device 1205 in computing environment 1200 can include one or more processing units, cores, or processors 1210, memory 1215 (e.g., RAM, ROM, and/or the like), internal storage 1220 (e.g., magnetic, optical, solid state storage, and/or organic), and/or I/O interface 1225, any of which can be coupled on a communication mechanism or bus 1230 for communicating information or embedded in the computer device 1205. I/O interface 1225 is also configured to receive images from cameras or provide images to projectors or displays, depending on the desired implementation.

Computer device 1205 can be communicatively coupled to input/user interface 1235 and output device/interface 1240. Either one or both of input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via I/O interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

I/O interface 1225 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, input unit 1270, output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide output based on the calculations described in example implementations.

Processor(s) 1210 can be configured to associate each location of one or more unidentified targets detected from sensor data of the one or more sensors with identifiers corresponding to the transmitter of each of the one or more pairs of electronic devices, by calculating first distance relationships indicative of relationships of distances between the each location of the one or more unidentified targets detected from sensor data of the one or more sensors and a reference point; calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships. As described herein, the distance relationships can be in the form of relative physical distances as described in FIGS. 3-11, or actual physical distances as based on the reduction level of the received signal strength index (e.g., having a preset relationship between reduction level of RSSI and actual distance in accordance with the desired implementation).

Processor(s) 1210 can be configured to associate the identifiers corresponding to the transmitter of the each of the one or more pairs of electronic devices with the each location of the one or more unidentified targets based on the first distance relationships and the second distance relationships by forming a first ranking from the first distance relationships based on a first distance length indicated by a distance between the each location of the one or more unidentified targets detected from the sensor data of the one or more sensors and the reference point; forming a second ranking from the second distance relationships based on a second distance length indicated by the distance between the transmitter and the receiver of each of the one or more pairs of electronic devices; and associating the each location of the one or more unidentified targets with the identifiers corresponding to the transmitter based on comparing the first ranking to the second ranking as illustrated in FIG. 6.

In example implementations in which the one or more sensors can involve one or more cameras configured to provide video, the sensor data of the one or more sensors is the video as illustrated in FIGS. 4A, 4B, and 8-11.

Processor(s) 1210 can be configured to associate the identifiers corresponding to the transmitter of the each of the one or more pairs of electronic devices with the each location of the one or more unidentified targets based on the first distance relationships and the second distance relationships comprises executing a combinatorial optimization algorithm configured to calculate lowest cost combinations of the identifiers corresponding to the transmitter and the each location of the one or more unidentified targets as illustrated in FIGS. 5-9. Examples of the combinatorial optimization algorithm can involve the Hungarian method or otherwise in accordance with the desired implementation.

Depending on the desired implementation, the cost of the combinatorial optimization algorithm can be determined from an absolute difference of distance relationships between first rankings of the first distance relationships and second rankings of the second distance relationships as illustrated in FIGS. 8-9.

Depending on the desired implementation, at least one of the one or more sensors or the one or more pairs of electronic devices can be in plurality, wherein a cost of the combinatorial optimization algorithm is based on a fusion of cost calculated by each cost between each of the sensors and each of the one or more pairs of the electronic devices as illustrated in FIG. 8-9.

Depending on the desired implementation, processor(s) 1210 can be configured to associate the identifiers corresponding to the transmitter of the each of the one or more pairs of electronic devices with the each location of the one or more unidentified targets based on the first distance relationships and the second distance relationships by dynamically switching between the combinatorial optimization algorithm and an association policy of associating only a closest one of the each location of the one or more unidentified targets to the reference point as illustrated in FIG. 8.

Depending on the desired implementation, the reference point can be a location of the receiver. In such example implementations, the location of the receiver can be detected from the sensor data of the one or more sensors (e.g., from the video) as the reference point as described in FIG. 8.

Depending on the desired implementation, the location system is configured to execute a perspective conversion to eliminate a perspective effect for the calculating of the first distance relationships and the second distance relationships as illustrated in FIGS. 11(A) and 11(B).

Depending on the desired implementation, the location system can be configured to provide bounding boxes of the each location of the one or more unidentified targets on one or more video frames of the video, wherein the processor(s) 1210 can be configured to determine physical distances between the each location of the one or more unidentified targets detected from the sensor data of the one or more sensors based on a width and length of the bounding boxes as illustrated in FIGS. 8-11.

Depending on the desired implementation, processor(s) 1210 can be configured to associate the identifiers corresponding to the transmitter of the each of the one or more pairs of electronic devices with the each location of the one or more unidentified targets based on the first distance relationships and the second distance relationships according to a time interval, the time interval utilized to calculate a most likely combination of identifiers corresponding the transmitter of the each of the one or more pairs of electronic devices to the each location of the one or more unidentified targets, wherein the time interval dynamically changes according to a change of at least one of the detected unidentified targets from the sensor data or detected identifiers corresponding to the transmitter of the one or more pairs of electronic devices as illustrated in FIGS. 8-11.

Figure 13:
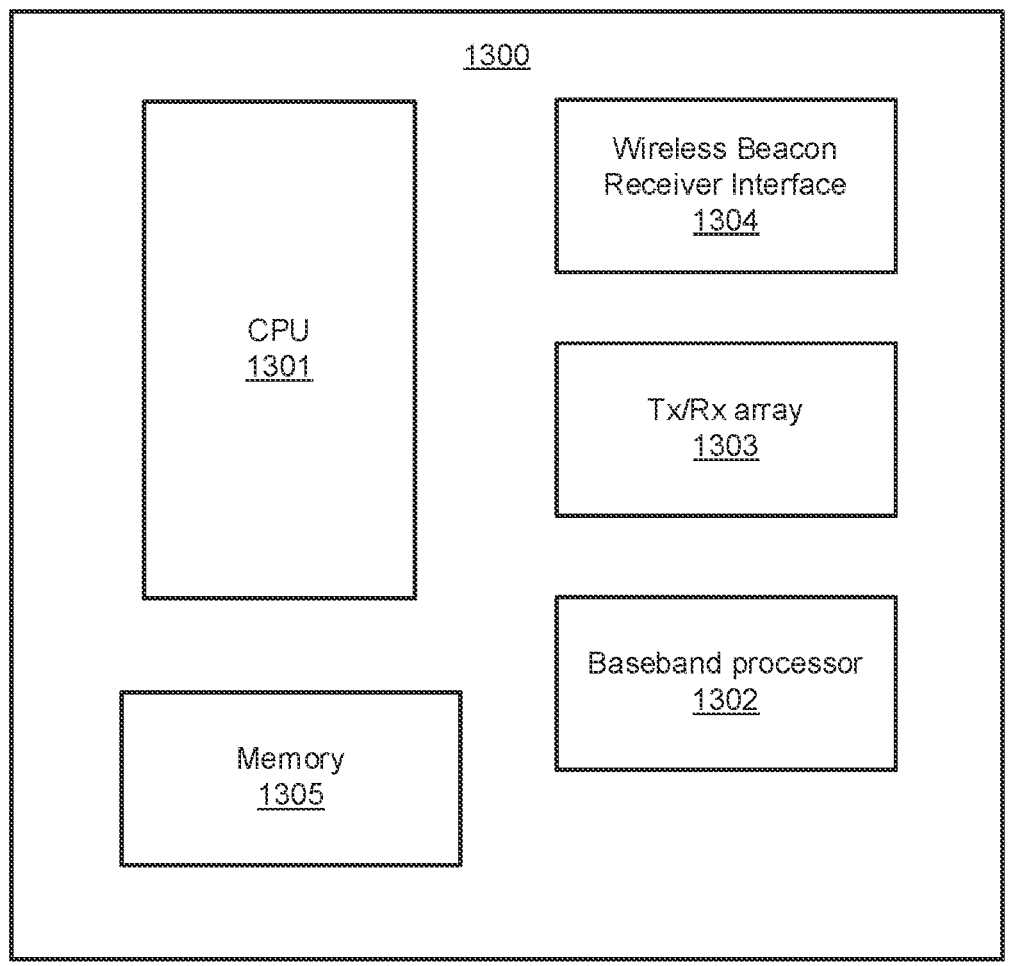
FIG. 13 illustrates an example wireless beacon receiver, in accordance with an example implementation.

FIG. 13 illustrates an example wireless beacon receiver configured to receive wireless media, in accordance with an example implementation. The wireless beacon receiver 1300 can be in the form of a pico base station, an enhanced node B (eNodeB), or other types of receivers in accordance with the desired implementation. The base station 1300 may include the following modules: the Central Processing Unit (CPU) 1301, the baseband processor 1302, the transmission/receiving (Tx/Rx) array 1303, the wireless beacon receiver interface 1304, and the memory 1305.

The baseband processor 1302 generates baseband signaling including the reference signal and the system information such as identifier information. The Tx/Rx array 1303 contains an array of antennas which are configured to facilitate communications with associated wireless beacon transmitters. The antennas may be grouped arbitrarily to form one or more active antenna ports. Associated wireless beacon transmitters may communicate with the Tx/Rx array to transmit signals containing the corresponding wireless beacon. The wireless beacon receiver interface 1304 is used to exchange traffic and interference information between one or more wireless beacon receivers or with the location system/computer to transmit information in accordance with the example implementation described herein. The memory 1305 can be configured to store and manage information regarding associated wireless beacon transmitters. Memory 1305 may take the form of a computer readable storage medium or can be replaced with a computer readable signal medium as described herein.

Figure 14:
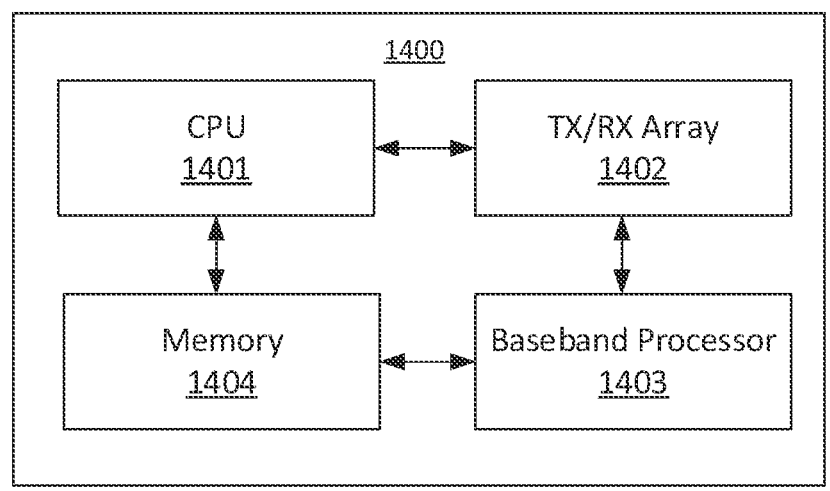
FIG. 14 illustrates an example wireless beacon transmitter, in accordance with an example implementation.

FIG. 14 illustrates an example wireless beacon transmitter configured to transmit wireless media, in accordance with an example implementation. The wireless beacon transmitter can be in the form of a user equipment (UE) or otherwise depending on the desired implementation. The UE 1400 may involve the following modules: the CPU module 1401, the Tx/Rx array 1402, the baseband processor 1403, and the memory 1404. The Tx/RX array 1402 may be implemented as an array of one or more antennas to communicate with the one or more wireless beacon receivers.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process on a location system comprising one or more sensors, a computer device, and one or more pairs of electronic devices comprising a transmitter configured to transmit wireless media and a receiver configured to receive wireless media, the instructions comprising:

associating each location of one or more unidentified targets detected from sensor data of the one or more sensors with identifiers corresponding to the transmitter of each of the one or more pairs of electronic devices, the associating comprising:

calculating first distance relationships indicative of relationships of distances between the each location of the one or more unidentified targets detected from the sensor data of the one or more sensors and a reference point;

calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships, wherein the associating the identifiers corresponding to the transmitter of the each of the one or more pairs of electronic devices with the each location of the one or more unidentified targets based on the first distance relationships and the second distance relationships comprises executing a combinatorial optimization algorithm configured to calculate lowest cost combinations of the identifiers corresponding to the transmitter and the each location of the one or more unidentified targets, and wherein cost of the combinatorial optimization algorithm is determined from an absolute difference of the first distance length and the second distance length between first rankings of the first distance relationships and second rankings of the second distance relationships.

2. The non-transitory computer readable medium of claim 1,
wherein the first rankings are formed from the first distance relationships based on a first distance length indicated by a distance between the each location of the one or more unidentified targets detected from the sensor data of the one or more sensors and the reference point; and
wherein the second rankings are formed from the second distance relationships based on a second distance length indicated by the distance between the transmitter and the receiver of each of the one or more pairs of electronic devices.

3. The non-transitory computer readable medium of claim 1, wherein the one or more sensors comprises one or more cameras configured to provide video, wherein the sensor data of the one or more sensors is the video.

4. The non-transitory computer readable medium of claim 3, wherein the location system is configured to provide bounding boxes of the each location of the one or more unidentified targets on one or more video frames of the video, wherein the instructions further comprise determining physical distances between the each location of the one or more unidentified targets detected from the sensor data based on a width and length of the bounding boxes.

5. The non-transitory computer readable medium of claim 1, wherein at least one of the one or more sensors or the one or more pairs of electronic devices are in plurality,
wherein a cost of the combinatorial optimization algorithm is based on a fusion of cost calculated by each cost between each of the one or more sensors and each of the one or more pairs of the electronic devices.

6. The non-transitory computer readable medium of claim 1, wherein the associating the identifiers corresponding to the transmitter of the each of the one or more pairs of electronic devices with the each location of the one or more unidentified targets based on the first distance relationships and the second distance relationships comprises dynamically switching between the combinatorial optimization algorithm and an association policy of associating only a closest one of the each location of the one or more unidentified targets to the reference point.

7. The non-transitory computer readable medium of claim 1, wherein the reference point is a location of the receiver.

8. The non-transitory computer readable medium of claim 7, wherein the location of the receiver is detected from the sensor data of the one or more sensors as the reference point.

9. The non-transitory computer readable medium of claim 1, wherein the location system is configured to execute a perspective conversion to eliminate a perspective effect for the calculating of the first distance relationships and the second distance relationships.

10. The non-transitory computer readable medium of claim 1, wherein the associating the identifiers corresponding to the transmitter of the each of the one or more pairs of electronic devices with the each location of the one or more unidentified targets based on the first distance relationships and the second distance relationships is conducted according to a time interval, the time interval utilized to calculate a most likely combination of identifiers corresponding to the transmitter of the each of the one or more pairs of electronic devices to the each location of the one or more unidentified targets,
wherein the time interval dynamically changes according to a change of at least one of the detected unidentified targets from the sensor data or detected identifiers corresponding to the transmitter of the one or more pairs of electronic devices.

11. A method for executing a process on a location system comprising one or more sensors, a computer device, and one or more pairs of electronic devices comprising a transmitter configured to transmit wireless media and a receiver configured to receive wireless media, the method comprising:

associating each location of one or more unidentified targets detected from sensor data of the one or more sensors with identifiers corresponding to the transmitter of each of the one or more pairs of electronic devices, the associating comprising:

calculating first distance relationships indicative of relationships of distances between the each location of the one or more unidentified targets detected from the sensor data of the one or more sensors and a reference point;

calculating second distance relationships indicative of relationships of distances between the transmitter and the receiver of each of the one or more pairs of electronic devices; and associating the identifiers corresponding to the transmitter of the each of the one or more pairs of electronic devices with the each location of the one or more unidentified targets based on the first distance relationships and the second distance relationships, wherein the associating the identifiers corresponding to the transmitter of the each of the one or more pairs of electronic devices with the each location of the one or more unidentified targets based on the first distance relationships and the second distance relationships comprises executing a combinatorial optimization algorithm configured to calculate lowest cost combinations of the identifiers corresponding to the transmitter and the each location of the one or more unidentified targets, and wherein cost of the combinatorial optimization algorithm is determined from an absolute difference of the first distance length and the second distance length between first rankings of the first distance relationships and second rankings of the second distance relationships.

12. The method of claim 11, wherein the first rankings are formed from the first distance relationships based on a first distance length indicated by a distance between the each location of the one or more unidentified targets detected from the sensor data of the one or more sensors and the reference point; and wherein the second rankings are formed from the second distance relationships based on a second distance length indicated by the distance between the transmitter and the receiver of each of the one or more pairs of electronic devices.

13. The method of claim 11, wherein the one or more sensors comprises one or more cameras configured to provide video, wherein the sensor data of the one or more sensors is the video.

14. The method of claim 5, wherein at least one of the one or more sensors or the one or more pairs of electronic devices are in plurality, wherein a cost of the combinatorial optimization algorithm is based on a fusion of cost calculated by each cost between each of the one or more sensors and each of the one or more pairs of the electronic devices.

15. The method of claim 11, wherein the associating the identifiers corresponding to the transmitter of the each of the one or more pairs of electronic devices with the each location of the one or more unidentified targets based on the first distance relationships and the second distance relationships comprises dynamically switching between the combinatorial optimization algorithm and an association policy of associating only a closest one of the each location of the one or more unidentified targets to the reference point.

16. The method of claim 11, wherein the reference point is a location of the receiver.

* * * * *